United States Patent [19]

Langerak et al.

[11] Patent Number: 4,897,191

[45] Date of Patent: Jan. 30, 1990

[54] TUBULAR MEMBRANE MODULE WITH FLUID SHEAR PROTECTION

[75] Inventors: Robert W. Langerak, Brantford; Paul B. Koehler, Burlington; Fernando A. Tonelli, Dundas; Radu Apostolache, Burlington, all of Canada

[73] Assignee: Zenon Environmental Inc., Burlington, Canada

[21] Appl. No.: 199,823

[22] Filed: May 27, 1988

[51] Int. Cl.$^4$ .............................................. B01D 13/01
[52] U.S. Cl. ............................ 210/321.81; 210/321.9; 55/158
[58] Field of Search ........... 210/321.6, 321.61, 321.79, 210/321.8, 321.87, 321.88, 321.89, 321.9, 321.81; 55/158

[56] References Cited

U.S. PATENT DOCUMENTS

| | | | |
|---|---|---|---|
| 2,353,489 | 7/1944 | Newcomb | 210/877 |
| 3,392,840 | 7/1968 | Clark et al. | 210/321.87 |
| 3,485,374 | 12/1969 | Marjikian et al. | 210/321.87 |
| 3,710,946 | 1/1973 | Sawyer | 210/321.87 |
| 3,716,143 | 2/1973 | Clark | 210/321.87 |
| 3,774,771 | 11/1973 | Marjikian et al. | 210/321.87 |
| 4,707,267 | 11/1987 | Johnson | 210/321.8 |

Primary Examiner—Richard V. Fisher
Assistant Examiner—Wanda L. Millard
Attorney, Agent, or Firm—Rogers, Bereskin & Parr

[57] ABSTRACT

A tubular membrane module for use in ultrafiltration or microfiltration has a bundle of membrane tubes that extend between inlet and return headers. The inlet header is fixed to one end of a tubular housing having a permeate outlet while the return header is free to float longitudinally of the housing to accomodate dimensional changes in the tubes with respect to the housing. The tubes are sealed at their ends in sockets in respective potting collars but are mechanically secured and sealed to the headers. The sockets are undercut to protect the membranes from stripping due to fluid shear.

9 Claims, 4 Drawing Sheets

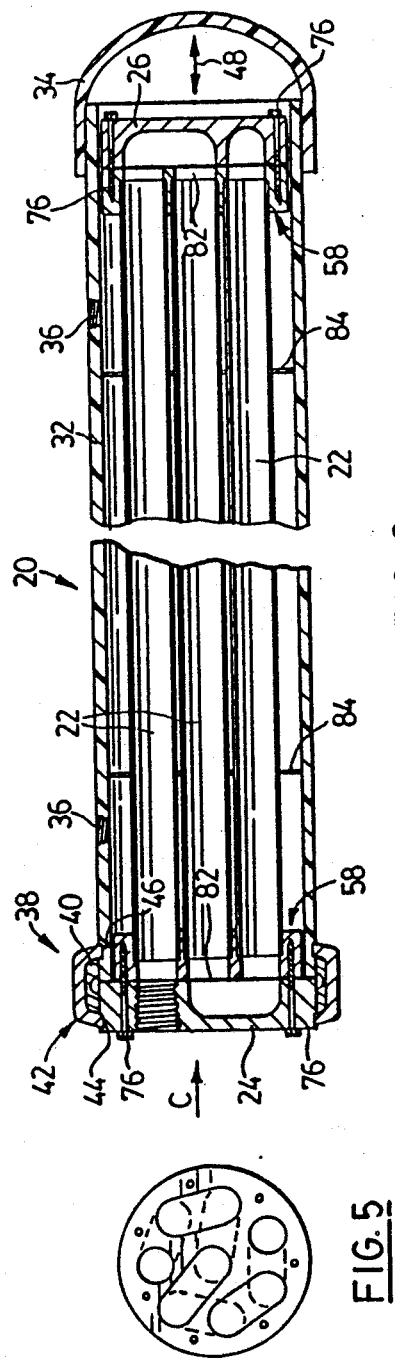
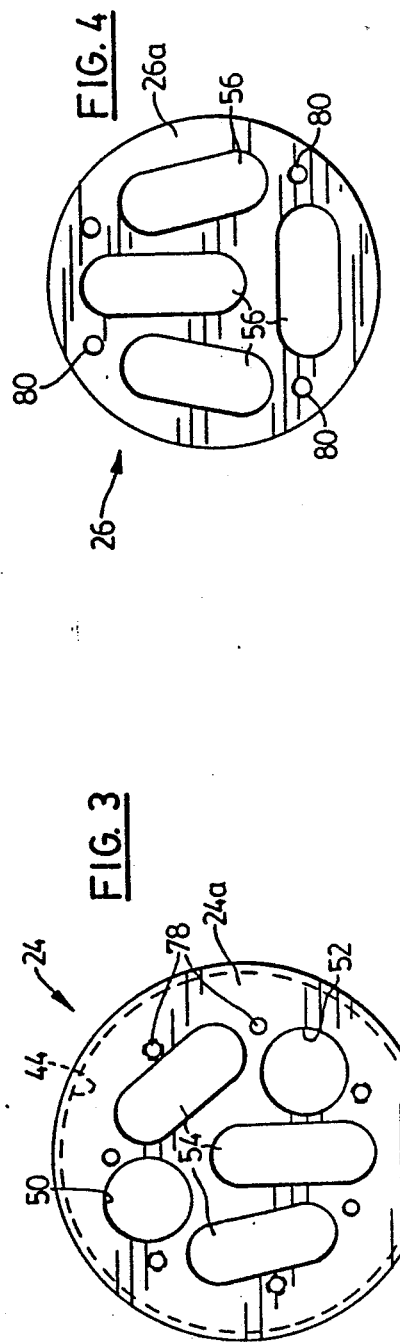
FIG. 2
FIG. 3
FIG. 4
FIG. 5

TUBULAR MEMBRANE MODULE WITH FLUID SHEAR PROTECTION

FIELD OF THE INVENTION

This invention relates to so-called tubular membrane modules used in pressure-driven fluid concentration and/or separation processes. Examples of such processes are microfiltration, ultrafiltration and reverse osmosis.

BACKGROUND OF THE INVENTION

The term "tubular membrane module" is used to refer to a component which includes a series of permeable membranes of tubular configuration each supported on the inner surface of a porous pipe such as a glass fibre-reinforced fabric pipe. The pipes are enclosed within an outer housing having a permeate outlet. Fluid to be treated is passed through the pipes under pressure. Permeate passes through the membranes and pipes into the interior of the outer housing and leaves through the permeate outlet.

DESCRIPTION OF THE PRIOR ART

U.S. Pat. No. 4,707,261 (Ikeyama et al.) discloses a tubular membrane ultrafiltration module in which a plurality of water permeable non-woven fabric pipes are formed on the inside surface of an outer cylinder. The pipes are inserted into the outer cylinder in a closely bundled state and the spaces between the pipes and the outer cylinder at each end are filled with hardened synthetic resin to fix and seal the assembly. In other words, the ultrafiltration module provided by the Ikeyama invention essentially comprises a monolithic structure of non-woven fabric pipes set in an outer cylinder by means of a hardened synthetic resin.

The following is a list of other prior art patents that were considered in the preparation of the present application:

| U.S. Patent Nos: | |
| --- | --- |
| 2,833,056 (Muller) | 4,155,853 (Shippey) |
| 3,707,234 (Salemi) | 4,461,707 (Thayer et al.) |
| 3,708,069 (Clark) | 4,610,789 (Barch) |
| 3,710,946 (Sawyer) | 4,675,109 (Applegate et al.) |

The patents listed above were considered to be of relevance in connection with the structure of the tubular membrane module provided by the present invention.

The following patents were considered relevant as disclosing prior art supported membrane structures:

| U.S. Pat. Nos: |
| --- |
| 2,932,597 (St. John et al.) |
| 3,312,250 (Sirignano et al.) |
| 3,676,193 (Cooper IV, et al.) |
| 4,101,423 (Merrill et al.) |
| 4,214,612 (de Putter) |

SUMMARY OF THE INVENTION

An object of the present invention is to provide a tubular membrane module which offers a number of practical advantages over prior art modules.

In one aspect of the invention the module includes a housing having a tubular shell with a closed first end, an inlet header sealed to the shell at a second end and a permeate outlet. A second header is disposed within the shell remote from the inlet header and is sized to fit closely within the shell while being free to float longitudinally of the shell. A plurality of membrane tubes extend between and are sealed to the headers. Each tube is made up of a porous pipe and a permeable membrane on the inner surface of the pipe. The module has inlet and outlet ports for fluid to be treated and permits flow of fluid from the inlet port, through the tubes to the outlet port.

The inlet header may include both the inlet port and the outlet port and at least the return header may have a return fluid passageway configured to permit fluid to flow through the membrane tubes in series from the inlet port to the outlet port. Alternatively, the module may be designed for parallel flow of fluid through the tubes.

It has been found that a module of the form provided by this aspect of the invention offers a number of practical advantages in terms of economy of construction. At the same time, the use of a free-floating return header assembly minimizes stresses on the membrane tubes in service that would otherwise be caused by changes in the length of the tubes due to factors such as temperature variations if a fixed header were employed.

In an alternative aspect of the invention that need not include a tubular shell or the feature of a free-floating header, the membrane tubes are sealed to the inlet and return headers by respective tube potting collars mechanically coupled in pressure-tight fashion to the inner faces of the respective headers. Each membrane tube is sealed in a socket in the respective collar and each socket has an annular blind end closely receiving an end portion of the tube. A port of smaller diameter than and within the blind end provides communication between the interior of the tube and the header so that the membrane on the tube is protected from fluid shear caused by fluid under pressure entering the tube from the header, via the port.

BRIEF DESCRIPTION OF THE DRAWINGS

In order that the invention may be more clearly understood, reference will now be made to the accompanying drawings which illustrate a particular preferred embodiment of the invention by way of example, and in which:

FIG. 2 is a vertical sectional view through the module of FIG. 1 as seen in the direction of arrow A;

FIGS. 3 and 4 are elevational views of the inner faces of the respective inlet and return headers of the module;

FIG. 5 is a diagrammatic illustration showing the passageways in the inlet header superimposed on those of the return header;

DESCRIPTION OF THE PREFERRED EMBODIMENT

Figure 1:
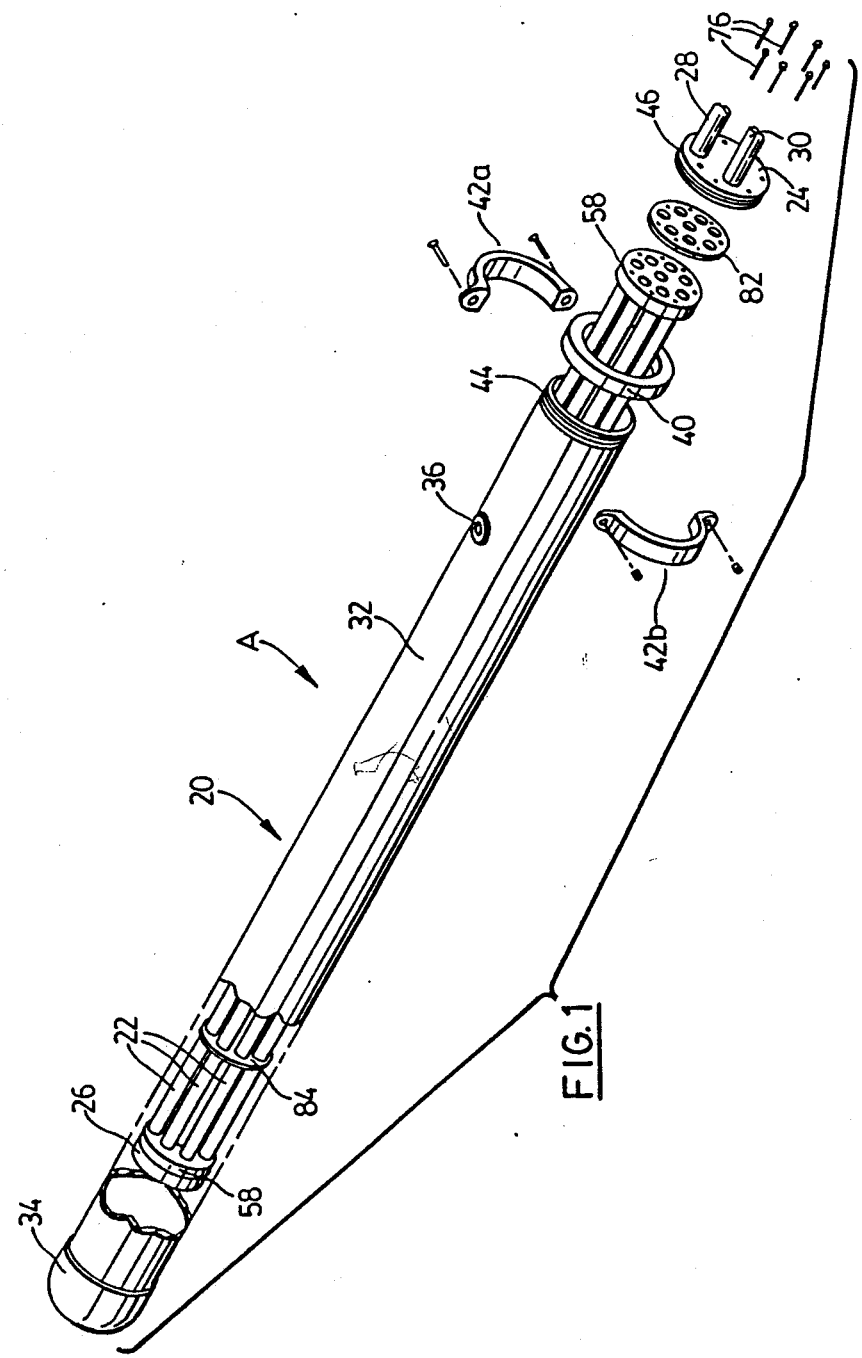
FIG. 1 is a perspective view, partly exploded and partly broken away, of a tubular membrane module in accordance with a preferred embodiment of the invention.

The drawings show a tubular membrane module that was developed particularly for use in microfiltration and ultrafiltration. Referring first to FIG. 1, the principal components of the module are a housing generally indicated by reference numeral 20 and a series or "bundle" of membrane tubes 22 which extend between respective inlet and return headers 24 and 26 in the assembled module. Inlet and return pipes for fluid to be treated are indicated respectively at 28 and 30 in FIG. 1.

FIG. 2 shows the assembled module. Housing 20 includes a plain tubular shell 32 which is closed at one end by an end cap 34 and at theother by the inlet header 24. In this particular embodiment, the shell 32 is a length of standard circular section PVC pipe. The end cap 34 is made of the same material and is permanently secured to shell 32 by a suitable solvent cement. Permeate outlets from housing 20 is provided by threaded ports 36 in shell 32.

Inlet header 24 has the overall shape of a circular disc (see FIG. 3) of the same diameter as shell 32 and is secured across the end of the shell opposite end cap 34 (FIG. 2). The inlet header is mechanically attached and sealed to shell 32 by a VICTAULIC TM clamp generally denoted by reference numeral 38. Clamp 38 includes an annular seal member 40 which encircles the joint line between shell 32 and end cap 24, and an outer bracket indicated at 42 which embraces the seal member 40 and which has inwardly directed flanges that engage in respective grooves 44 and 46 in header 24 and shell 32. As can be seen from FIG. 1, brackert 42 is in fact made up of two C-shaped members 42a and 42b which are bolted together.

Return header 26 also has the overall shape of a circular disc but is of somewhat less diameter than the inlet header 24. Return header is sized to fit closely within the shell 32 of module housing 20 but is free to float longidutinally of the module, as indicated by the arrow 48 in FIG. 2.

The two headers 24, 26 are both moulded in a PVC material and are shaped to provide on their respective inner surfaces return fluid passageways configured to permit fluid to flow through the membrane tubes 22 in series. Referring more specifically to FIGS. 3 and 4, the inner surface of inlet header 24 is shown in FIG. 3 and is denoted by reference numeral 24a while the inner surface of return header 26 is shown in FIG. 4 and is denoted 26a. Inlet header 24 has respective inlet and outlet ports 50 and 52 which communicate with the inlet and outlet pipes 28 and 30 respectively shown in FIG. 1 when the module is in use. The return fluid passageways are individually denoted by reference numeral 54 and it will be seen that three such passageways are provided in the case of inlet header 24. Return header 26 has no ports but has four return fluid passageways individually denoted at 56.

FIG. 5 is an artificial view in the direction of arrow C in FIG. 2 and shows in full lines the ports 50, 52 and return passageways 54 of the inlet header 24 superimposed on the passageways 56 of the return header 26 (which are shown in dotted lines). This view illustrates quite graphically how the ports and passageways co-operate to provide for series flow of fluid through the membrane tubes 22.

It will of course be appreciated that FIG. 5 shows the ports and passageways of inlet header 24 in mirror image as compared with FIG. 3 because those ports and passageways are illustrated as they would be seen in the direction of arrow C (i.e. from the outer end of inlet header 24). It will also be appreciated that the particular configuration of ports and passageways shown in the drawings is designed to accomodate eight membrane tubes arranged with one tube at the centre and the remainder equiangularly spaced around the center tube. The number of tubes and, consequently, the configuration and arrangement of return fluid passageways may of course vary within the broad scope of the invention. In another practical embodiment, a module having twenty tubes is provided.

While it would be possible to couple the membrane tubes directly to the respective headers 24, 26, in the illustrated embodiment, respective potting collars are used at opposite ends of the bundle of tubes to couple the tubes to the respective headers. The potting collars are identical and are individually denoted by reference numeral 58 in FIG. 2. One of those collars is shown separately in FIGS. 6, 7 and 7a. Again, the component is a disc-shaped PVC moulding.

Figure 7A:
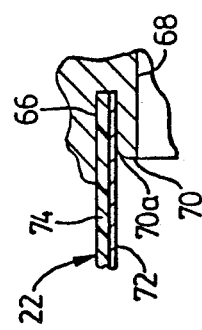
FIG. 7a is a detail view of the part of FIG. 7 circled at B.
Figure 7:
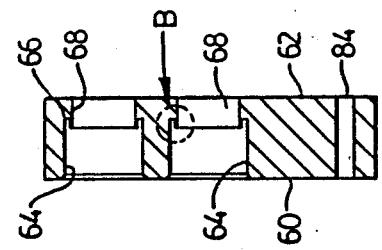
FIG. 7 is a sectional view on line 7—7 of FIG. 6.
Figure 6:
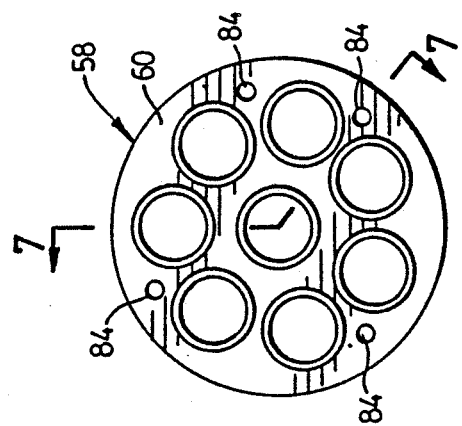
FIG. 6 is an elevational view of one of the tube potting collars used in the module.

As seen in FIG. 7, the potting collar has an inner face 60 at which the tubes are coupled to the collar, and an outer face 62 which bears against the inner face of the relevant header 24 or 26 in the assembled module. The inner face 60 of the collar is formed with a series of sockets 64 for receiving the membrane tubes. The sockets are of course arranged in a configuration corresponding to the configuration of the tubes in the bundle; that is, with a single centre tube and seven further tubes equiangularly spaced around the center tube as shown in FIG. 6. Referring back to FIG. 7, each socket 64 has an annular blind end 66 for closely receiving an end portion of one of the tubes 22. A port 68 of smaller diameter than and located within the blind end portion 64 of the socket provides communication between the interior of the tube and the header in the assembled module.

FIG. 7a shows an enlarged detail of part of the annular blind end of one of the sockets 66 and part of one of the tubes 22 in place in the socket. The tubes are sealed into the sockets by an appropriate epoxy resin. It will be seen from FIG. 7a that the blind end 66 of socket 64 in effect forms an undercut with respect to the port 68, leaving a shoulder 70 between the port and the tube. Shoulder 70 is radiussed at 70a to facilitate insertion of the tubes into the sockets. Shoulder 70 in effect protects the tube from the effects of fluid shear caused by fluid entering the tube 22 from the port 68 under pressure. The fluid shear effect could otherwise cause the membrane to be stripped from the inner surface of tube 22. In FIG. 7a, the membrane is denoted by reference numeral 72 and is illustrated as having an exaggerated thickness. The membrane is cast on to the inner surface of a glass fibre-reinforced fabric pipe 74 by a technique that is well-known in the art. The pipe itself has not been illustrated in detail since it too may be of conventional form. For example, the pipe may comprise several layers of spirally wound fabric tapes. These may be filament wound with glass fibres impregnated with a suitable thermosetting plastic resin, when extra strength is required.

Referring back to FIG. 2, it will be appreciated that the use of the potting collars 58 allows the bundle of tubes and collars to be preformed as a sub-assembly to which the respective headers 24 and 26 are subsequently attached. In this particular embodiment, mechanical attachment is used. Specifically, a series of socket-headed cap screws which are individually denoted by reference numeral 76 in FIG. 2 are inserted through preformed holes in the respective headers and driven into the respective potting collars in the manner of self-tapping screws. Preformed holes in the two headers for receiving the screws are indicated at 78 in the case of inlet header 24 (FIG. 3) and at 80 in the case of return header 26 (FIG. 4).

A neoprene gasket is used between each header and potting collar in the assembled module; the two gaskets are indicated at 82 in FIG. 2. FIG. 2 also shows tube support baffles or "spiders" 84 which may be used between the potting collars to help protect against sagging or deflection of the tubes due to the weight of fluid, internal pressure or temperature. These "spiders" are essentially thin PVC discs having an external diameter slightly less than the internal diameter of the housing shell 32, and each of which is formed with a series of holes for receiving membrane tubes. The holes are dimensioned so that the spiders can frictionally fit onto the tubes. In a very short module, the spiders may be unnecessary, while in longer modules two or even more spiders may be necessary.

By way of example, the module 20 shown in the drawings may have an overall nominal length of approximately 6.5 feet. It will be appreciated that, since the tubes are not made of the same material as the shell, the overall length of the tubes may vary with respect to the shell in response to varying temperature conditions. The fact that the return header 26 is free to float longitudinally accomodates this variation without imposing stresses on the tubes in service. It will also be appreciated that the particular design of the module is economic in the sense that it permits the use of standard pipe sizes for the shell 32.

Figure 8:
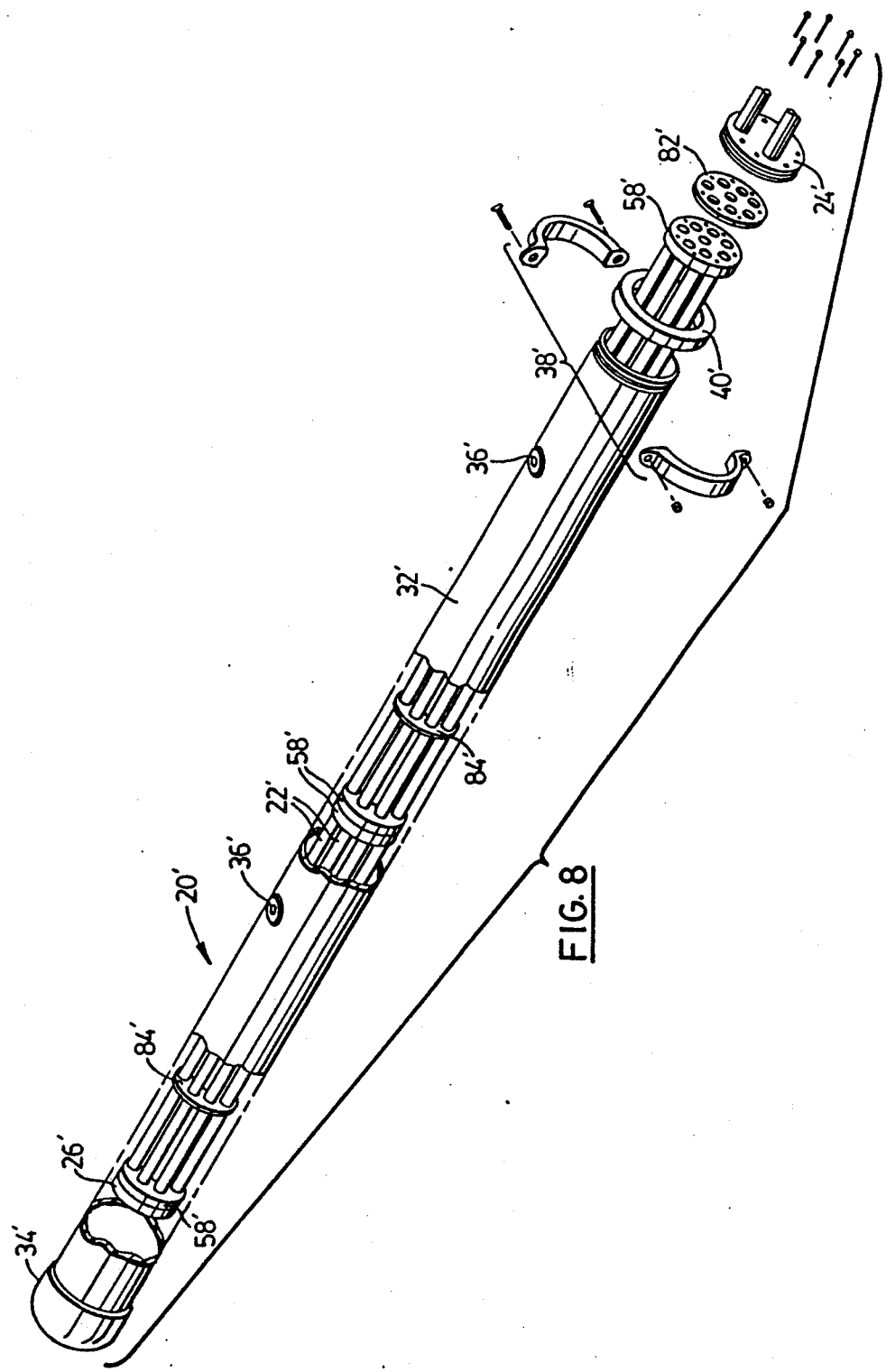
FIG. 8 is a view similar to FIG. 1 showing a module of extended length.

FIG. 8 illustrates that it is possible to multiply the capacity of the module by simply using a longer tube for the shell 32 and bolting end to end together two or more sub-assemblies each comprising a series of tubes and a pair of potting collars. Primed reference numerals have been used in FIG. 8 to denote parts that correspond with parts shown in the previous views. Thus, it will be seen that two potting collars 58' of a pair of tube bundle sub-assemblies are bolted together face to face with respective inlet and return headers 24' and 26' at opposite ends of the assembly. The potting collars are preformed with holes for receiving such bolts, as indicated at 84 in FIGS. 6 and 7. It will be understood from FIG. 8 that the facility for the return header 26' to float longitudinally of the shell 32' is particularly important in an extended module of this form.

It should finally be noted that the preceding description relates to a particular preferred embodiment of the invention only and that many modifications are possible within the broad scope of the invention. Some such modifications have been indicated previously and others will be readily apparent to a person skilled in the art.

More specifically, while the preceding description relates specifically to a series-flow module, the module may be adapted for parallel flow. In that event, the return header 26 would be replaced by a simple through-flow outlet header and neither header would have return fluid flow passageways. It would be necessary to seal the outlet header within shell 32 (for example by means of an O ring) and to provide for a fluid outlet through the end cap 34 of the module.

It should also be noted that the features of a tubular shell and free floating header as described in connection with the preferred embodiment are not essential. For example, in an alternative embodiment, the module housing could be a simple box-shaped structure having a permeate outlet. The inlet header 24 would then be sealed in a wall of the housing. In fact, the same housing could be fitted with a plurality of tube assemblies each comprising a bundle of membrane tubes extending between a pair of headers. Normally, a series flow configuration would be used, although it would be possible to provide for parallel flow by locating the two headers in opposite walls of the housing. In any event, the tubes could be coupled to the headers by tube potting collars generally as described with particular reference to FIGS. 6, 7 and 7a of the drawings.

We claim:

1. A tubular membrane module, comprising:
   a housing which includes a tubular shell having a closed first end, and a permeate outlet;
   a fixed inlet header sealed to said shell at a second end thereof;
   a second, floating return header disposed within said shell remote from said inlet header, said second header being sized to fit closely within said shell but being free to move longitudinally with respect to the shell when the module is in use; and,
   a plurality of membrane tubes extending between and sealed to said headers, each tube comprising a porous pipe having an inner surface, and a permeable membrane on said surface;
   the module having inlet and outlet ports for fluid to be treated and permitting flow of fluid from said inlet port through said tubes to said outlet port.

2. A module as claimed in claim 1, wherein said inlet header includes said inlet and outlet ports, and wherein at least said return header has a return fluid passageway configured to permit fluid to flow through said membrane tubes in series from said inlet port to said outlet port.

3. A module as claimed in claim 1, further comprising respective tube potting collars sealing the membrane tubes to said inlet and return headers, each potting collar being mechanically coupled in pressure-tight fashion to an inner face of the respective header and at least an inlet end portion of each membrane tube being sealed in a respective socket in the collar, each socket having an annular blind end closely receiving said end portion of the respective tube, and a port of smaller diameter than and within said blind end providing communication between the interior of the tube and header, whereby the membrane on the tube is protected from fluid shear caused by fluid entering the tube from the header under pressure.

4. A module as claimed in claim 3, wherein said membrane tubes and potting collars form a sub-assembly of the module and wherein the module comprises a plurality of said sub-assemblies coupled together end to end between said inlet and return headers, the tubes in respective sub-assemblies being aligned with one another, and wherein said tubular shell comprises a length of plastic tubing selected to accomodate said sub-assemblies.

5. A module as claimed in-claim 1, wherein said shell comprises a length of standard plastic pipe, and wherein said inlet header has the overall shape of a disc of substantially the same external diameter as the diameter of the shell and is coupled to the shell over said second end by an external clamp which includes an annular seal encircling the joint between the shell and the inlet header, and a bracket enclosing said seal.

6. A module as claimed in claim 1, wherein said shell comprises a length of plastic tube, and wherein said inlet and return headers each comprise a disc-shaped plastic moulding.

7. A module as claimed in claim 1, further comprising at least one membrane tube support baffle disposed in said shell between the headers, the tubes passing through the baffle and the baffle being dimensioned to fit closely within said shell.

8. A tubular membrane module comprising:
- a plurality of membrane tubes, each comprising a porous pipe having an inner surface and a permeable membrane on said surface;
- a pair of headers disposed at respectively opposite ends of said tubes; and,
- respective tube potting collars sealing the membrane tubes to said headers, each potting collar being mechanically coupled in pressure-tight fashion to an inner face of the respective header and at least an inlet end portion of each membrane tube being sealed in a respective socket in the collar, each socket having an annular blind end closely receiving said end portion of the respective tube, a port of smaller diameter than and within said blind end providing communication between the interior of the tube and header, and a shoulder between said port and blind end, said shoulder spacing the membrane on the tube from said port, whereby the membrane is protected from fluid shear caused by fluid entering the tube from the header under pressure;
- the module having inlet and outlet ports for fluid to be treated and permitting flow of fluid from said inlet port through said tubes to said outlet port, one of said headers comprising an inlet header and having at least said inlet port; and,
- a closed housing receiving said membrane tubes, said housing having a permeate outlet, and said inlet header being coupled to said housing so that said inlet port is accessible from externally of the housing.

9. A tube assembly for use in a tubular membrane module which includes a pair of headers, said assembly comprising a bundle of membrane tubes, each in the form of a porous pipe having a permeable membrane on its inner surface, and a pair of potting collars each adapted to be mechanically coupled in pressure-tight fashion to an inner face of one of said headers, at least an inlet end portion of each membrane tube being received and sealed in a respective socket in one of said collars, each said socket having an annular blind end closely receiving said end portion of the tube, a port of smaller diameter than and within said blind end for providing communication between the interior of the tube and the said header to which the potting collar is coupled and a shoulder between said port and blind end, said shoulder spacing the membrane on the tube from said port, whereby the membrane is protected from fluid shear caused by fluid entering the tube from the header under pressure, in use.

* * * * *